United States Patent

Kilmer

[11] Patent Number: 6,092,817
[45] Date of Patent: Jul. 25, 2000

[54] ADJUSTABLE TOTE

[75] Inventor: Thomas K. Kilmer, Souderton, Pa.

[73] Assignee: Sterling Suma, Ltd., Souderton, Pa.

[21] Appl. No.: 09/076,492

[22] Filed: May 12, 1998

[51] Int. Cl.$^7$ ..................................................... B62B 1/00
[52] U.S. Cl. .................. 280/47.26; 280/654; 280/655.1; 280/652; 280/63
[58] Field of Search ................................. 280/654, 655.1, 280/655, 652, 47.26, 63, 47.131; 5/625, 626, 627; 224/921; 248/235; 403/231

[56] References Cited

U.S. PATENT DOCUMENTS

| | | |
|---|---|---|
| 220,865 | 10/1879 | Petteys . |
| 438,249 | 10/1890 | De Haer . |
| 959,423 | 5/1910 | Blair . |
| 2,290,535 | 7/1942 | Cavins ............................... 248/235 X |
| 2,544,977 | 3/1951 | Blank ..................................... 5/625 X |
| 2,580,536 | 1/1952 | Fiorenzi ............................ 248/235 X |
| 2,757,935 | 8/1956 | Sofia .................................. 280/655 X |
| 2,897,013 | 7/1959 | Delp ..................................... 5/626 X |
| 2,980,980 | 4/1961 | Goetzinger et al. ................... 5/626 X |
| 3,612,563 | 10/1971 | Kazmark . |
| 3,826,511 | 7/1974 | Frank . |
| 4,478,429 | 10/1984 | Adams ................................. 280/655 |
| 4,697,834 | 10/1987 | Scott ................................ 280/654 X |
| 4,795,186 | 1/1989 | Tyus . |
| 5,590,891 | 1/1997 | Kazmark, Jr. ................. 280/47.26 X |
| 5,806,878 | 9/1998 | Mroczka et al. ................. 280/655 X |

*Primary Examiner*—Brian L. Johnson
*Assistant Examiner*—Bryan Fischmann
*Attorney, Agent, or Firm*—Louis Weinstein

[57] ABSTRACT

A light-weight carrier comprised of hollow tubular members joined by angle brackets to form a substantially rectangular structure. Two longer sides extend beyond the ends of the two shorter sides. The first ends of the two longer sides receive and support an axle having a pair of wheels mounted thereto. The angle brackets each secure a long and short side and assure rectangularity. At least one pair of brackets, preferably those remote from the wheels, may be moved closer to or further removed from the brackets closer to the wheels, thereby, respectively, extending or reducing the overall length thereof. The net is loosely coupled to all four (4) sides of the frame and cooperates with a pair of criss-crossed bungee cords or the like to retain articles on the tote. The short piece remote from the axle serves as a handle.

12 Claims, 4 Drawing Sheets

ADJUSTABLE TOTE

FIELD OF THE INVENTION

The present invention relates to carriers and more particularly, to an extremely light weight carrier (i.e., tote) capable of simple adjustment by movement of angle brackets to tighten or loosen a net loosely coupled to three sides of the tote.

BACKGROUND OF THE INVENTION

It is desirable to provide a tote or carrier capable of carrying articles of different sizes and shapes, which articles may be difficult to carry more so because of their bulkiness than their weight. In addition, it is highly desirable to provide such a tote or carrier, which is extremely light in weight and yet sturdy and which is capable of being adjusted to accommodate the load, i.e., the articles carried thereon.

BRIEF DESCRIPTION OF THE INVENTION

The present invention provides an adjustable tote which achieves all of the above objectives and is characterized by comprising a light-weight carrier comprised of tubular members joined by angle brackets to form a substantially rectangular structure. Two longer sides extend beyond the ends of the two shorter sides. The first ends of the two longer sides receive and support an axle having a pair of wheels mounted thereto. The brackets secure the long and short sides to one another and assure rectangularity. At least one pair of brackets, preferably those remote from the wheels, may be moved closer to or further removed from the brackets having the wheels nearby, respectively, extending or reducing the overall length thereof. The net is loosely coupled to all four (4) sides of the frame and cooperates with a pair of criss-crossed bungee cords or the like to secure the articles to the tote. The short piece remote from the axle serves as a handle.

OBJECTS OF THE INVENTION

One object of the present invention is to provide a novel light weight, sturdy, adjustable tote.

Still another object of the present invention is to provide a novel light weight, sturdy tote which is easily maneuverable over any surface.

Still another object of the present invention is to provide a light weight, sturdy tote provided with a carrier net and having means to adjust the tightness or looseness of the carrier net.

DETAILED DESCRIPTION OF THE INVENTION

The tote assembly 10 of the present invention comprises a pair of elongated, preferably hollow, tubular members 12 and 14 which are preferably formed of aluminum, although other materials of similar strength and rigidity, such as plastic, may be provided. The tubular members may have a circular or polygonal cross-section (i.e., rectangular, pentagonal, hexagonal, octagonal, etc.) A pair of tubular members 16 and 18 which are shorter in length than the tubular members 12 and 14 are arranged at right angles to members 12 and 14 and are secured by angle brackets 20, 20', 20", and 20'", arranged at mating portions of the tubular members 12, 14, 16, and 18.

Each of the bracket assemblies 20–20'" are identical in design and function and only one of the bracket assemblies will be described herein in detail for purposes of simplicity.

Figure 3A:
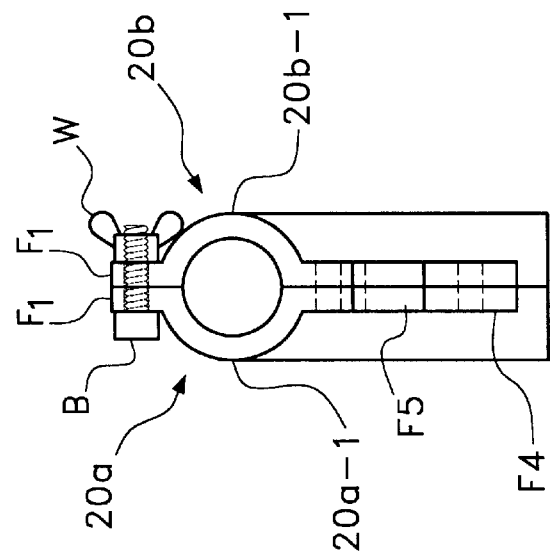
FIG. 3A shows a sectional view of the bracket assembly of FIG. 3 looking in the direction of arrows 3A—3A.
Figure 3:
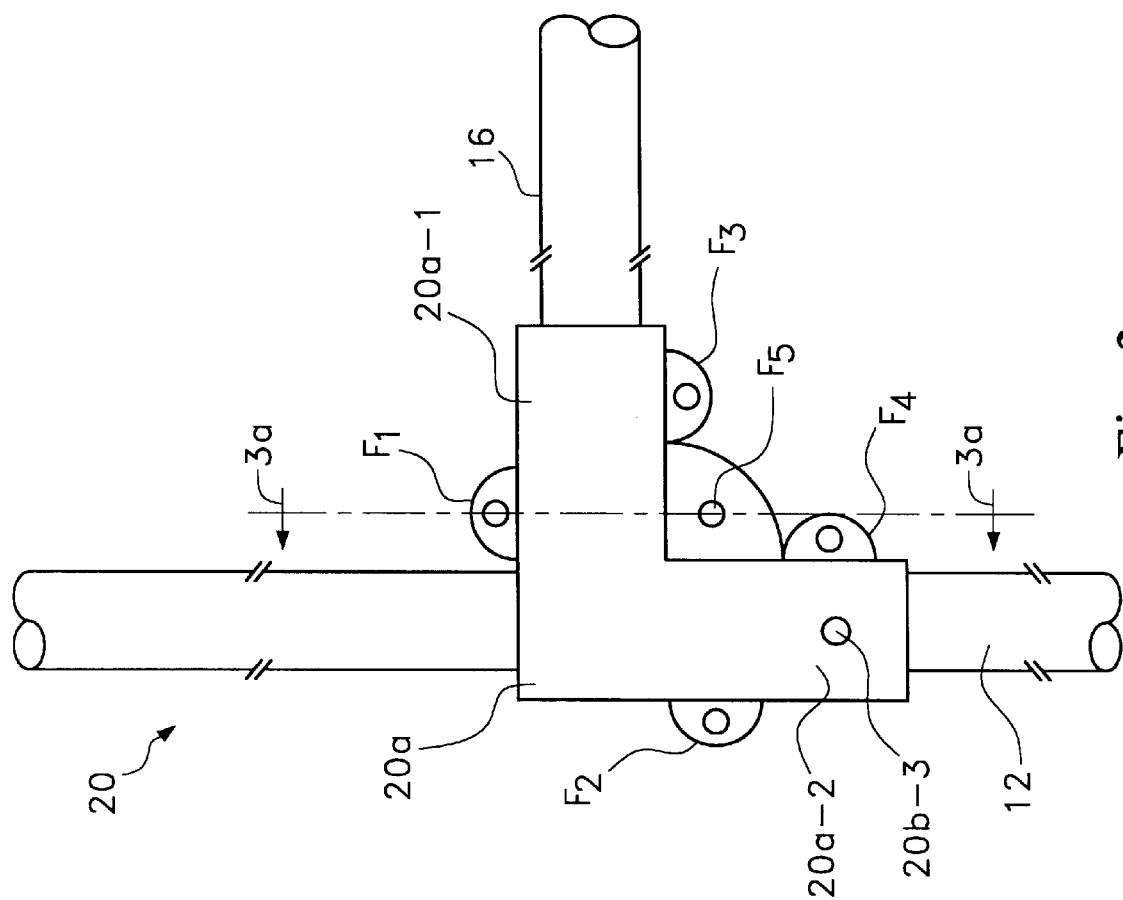
FIG. 3 shows a plan view of a typical angle bracket employed in the tote of FIG. 1
Figure 4:
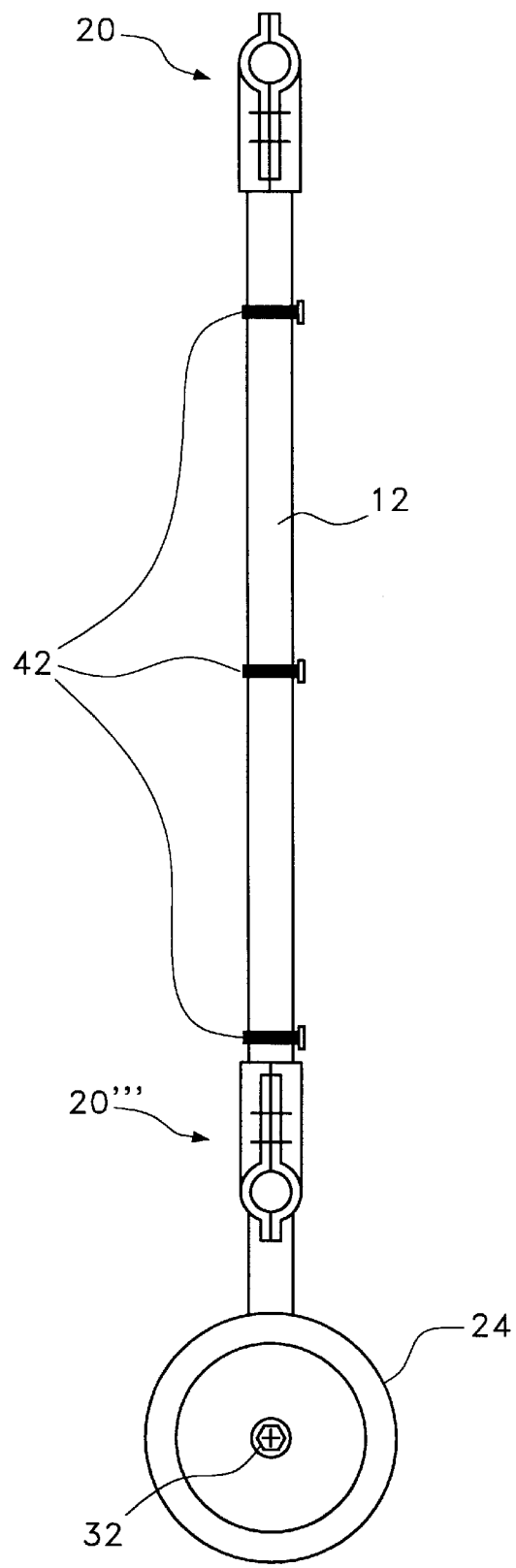
FIG. 4 shows a side view of the tote assembly in FIG. 1.

Bracket assembly 20 is shown in greater detail in FIGS. 3 and 3A and is comprised of a pair of angle bracket members 20a and 20b each having semi-circular recess portions such as the semi-circular portions 20a-1 and 20a-2, which portions are arranged at right angles to one another. Similar semi-circular portions of bracket member 20b cooperate with the portions 20a-1 and 20a-2 to form a circular holding portion for the tubular member received therein. For example, circular portions 20a-1 and 20b-1 receive tubular member 16 while semi-circular portions 20a-2, 20b-2 receive the tubular member 12. In the event that the hollow tubular members are of a polygonal cross-section, the recess portions of bracket 20 are also preferably polygonal and conform to the shape of the tubular member.

Each of the bracket members 20a and 20b have a plurality of integral projecting flanges. For example, bracket member 20a has flanges, also typically referred to as ear tabs, F1, F2, F3, and F4. Similar tabs are provided as an integral part of bracket member 20b, all of the tabs being aligned for the purpose of receiving a conventional fastening member, such as threaded bolt and a tapped wing-nut (not shown for purposes of simplicity), to secure bracket members 20a and 20b to one another and thereby secure the tubular members 16 and 12 thereto. For example, ear tabs F1 receive bolt B and wing-nut W through the openings provided therein to secure the ear tabs F1, F1 to one another. The remaining pairs of tabs F2–F4 provided on each of members 20a and 20b are secured in a similar fashion. The inner diameter of the semi-circular portions, such as 20a-1 and 20b-1, are preferably slightly less than the outer diameter of the tubular member 16 to assure that the tubular member is firmly clamped within the semicircular shaped portions to assure that tubular member 16 is properly clamped therein. Semi-circular sections receiving tubular member 12 are designed in a similar fashion.

Bracket member 20a is provided with an opening 20b-3 in an outward portion of the semi-circular section 20a-2. Cooperating openings 12a, 12b, and 12c are provided at the upper end of tubular member 12 (see FIG. 2) as well as an opening 12d, provided near the lower end of tubular member 12, which openings cooperate with opening 20a-3 to secure tubular member 12 from sliding relative to bracket assembly 20, through the insertion of a suitable threaded fastener (not shown). A similar threaded fastener is inserted through opening 12d in tubular member 12 and opening 12a-3 in bracket assembly 20'" to prevent movement of tubular member 12 relative to bracket assembly 20'". Tubular member 14 is provided with similar openings 14a–14d which cooperate with openings in bracket assemblies 20' and 20" to lock tubular member 14 against movement relative to bracket assemblies 20 and 20", upon insertion of a suitable threaded fastener.

The openings 12b and 12c, and 14b and 14c, in addition to openings 12a and 14a, provide for adjustment of the bracket assemblies 20 and 20' at spaced intervals along the length of the tubular members 12 and 14 for a purpose to be more fully described.

The lower ends of tubular members 12 and 14 extend beyond the bracket assemblies 20'" and 20" and are provided with suitable openings 12e and 14e which are aligned along a common diameter so as to receive and support an elongated rod 22 which serves as an axle for wheels 24, 26.

C-clips 32 and 34 are provided to retain wheels 24 and 26 on rod 22. Clips 32 and 34 may either be c-clips or end-caps.

Figure 1:
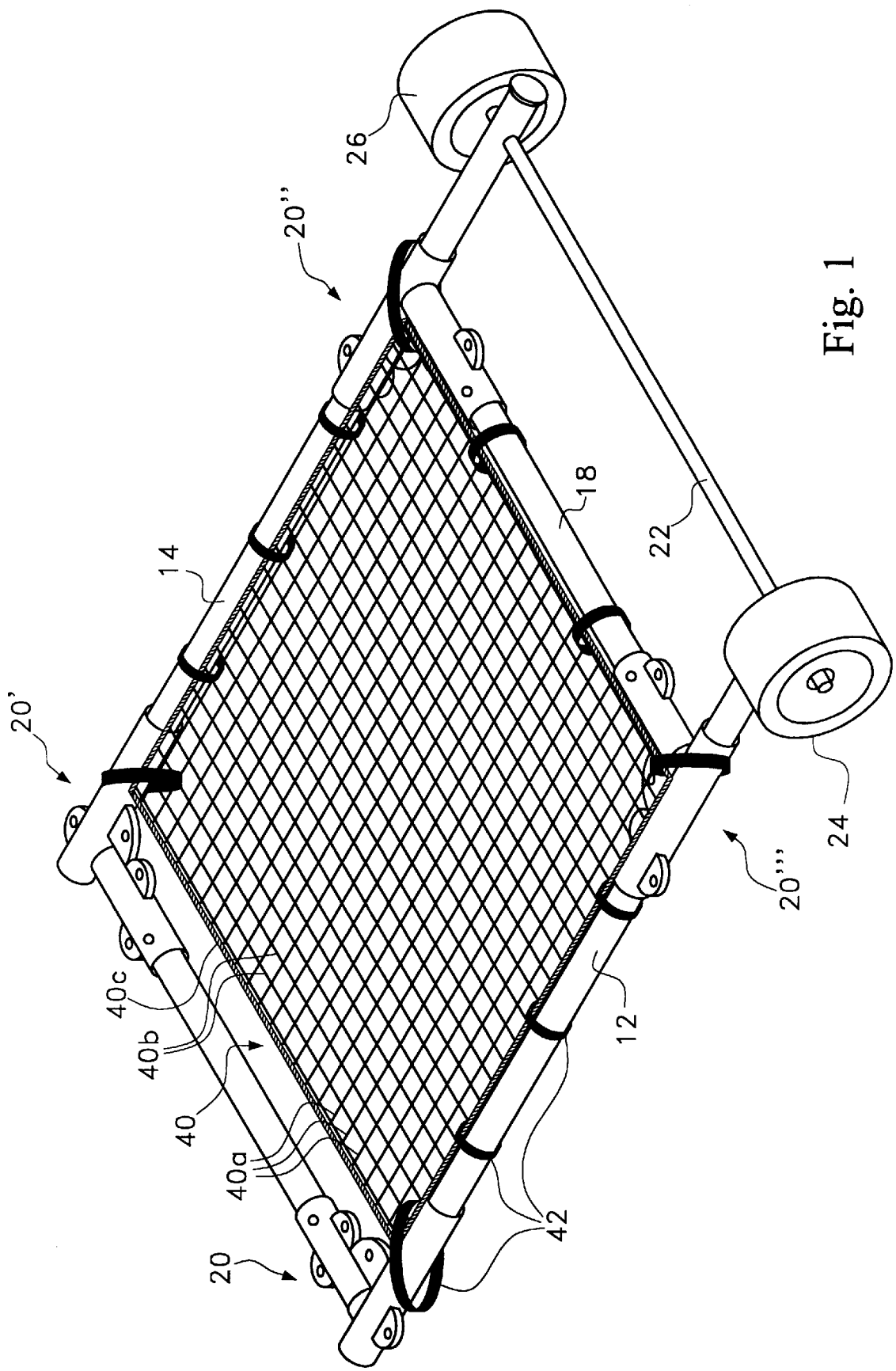
FIG. 1 is a perspective view of a tote embodying the principles of the present invention.

A fabric net 40, comprised of a plurality of vertically aligned cords 40a arranged at right angles with and joined to a plurality of horizontally aligned cords 40b form a grid like net portion having a rope border 40c of significantly increased diameter relative to cords 40a and 40b. Rope border 40c serves as the boundary member of the net assembly to which the opposing ends of the vertically aligned cords 40a and horizontally aligned cords 40b are secured. The net assembly is secured to the tubular frame comprised of members 12, 14, 16, and 18 by a plurality of cable ties 42 which respectively encircle the perimeter rope 40c and the tubular members 12, 14, 16, and 18 at spaced intervals, as shown best in FIGS. 1 and 2. Corner cable ties 44, of slightly greater size than ties 42, are arranged at each corner of the assembly and overlie the brackets 20–20'", as shown best in FIGS. 1 and 2.

Figure 2:
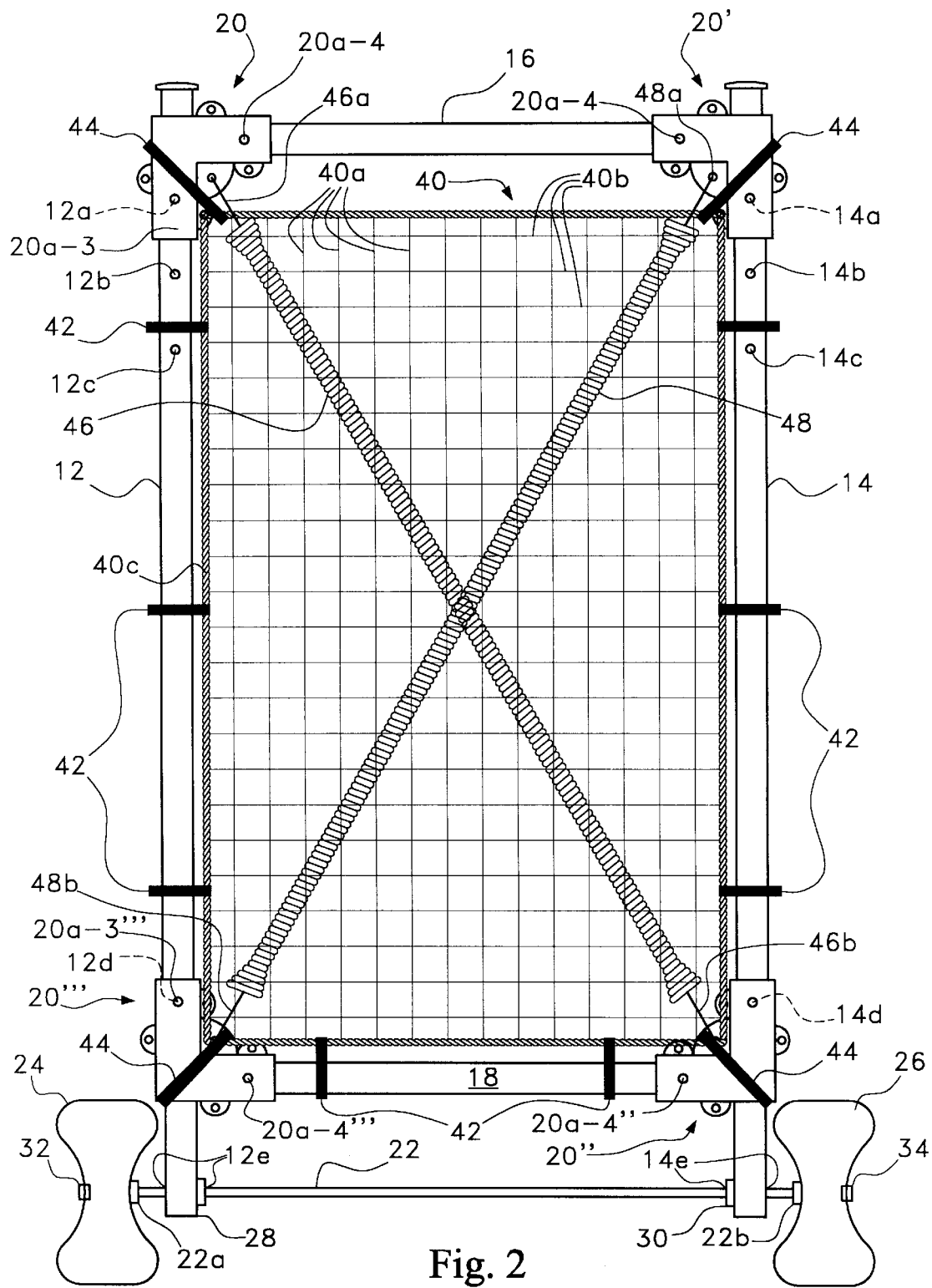
FIG. 2 is front view of the tote shown in FIG. 1.

A pair of bungee cords 46 and 48 each have a pair of hook-shaped ends 46a, 46b and 48a, 48b, respectively, which hook-shaped ends are releasably secured within an opening in inside corner flange F5, in the manner shown in FIG. 2.

The net assembly 40 may be loosened or tightened by changing the positions of bracket assemblies 20 and 20' along tubular members 12 and 14. For example, FIG. 2 shows the net assembly 40 in the stretched position which is attained by aligning the openings 20a-3 of bracket assemblies 20 and 20' with the openings 12a and 14a respectively, of tubular members 12 and 14. Conversely, moving the bracket assemblies 20 and 20' downwardly so as to align the openings 20a-3 with openings 12b–14b or 12c14c, accordingly loosened the net to accommodate more bulky items. FIG. 3 shows the manner in which tubular member 12 extends beyond bracket assembly 20, thereby loosening the net assembly 40. The brackets 20–20'" are also provided with openings 20a-4 for receiving threaded screws or the like to secure the cross pieces 16, 18 to the brackets to 20–20'", additional holes may be provided in cross pieces 16, 18 to increase the separation of long pieces 12, 14 (to a lesser extent than the maximum separation distance between cross pieces 16, 18).

The manner in which the tote assembly is used is as follows:

The hooks of bungee cords 46 and 48 are removed at at least two ends thereof and the items to be transported are placed on net assembly 40. The net assembly is sufficiently yeildable to accommodate items of a variety of sizes and shapes. For example, tote assembly 10 may be utilized to transport beach items, such as, folding chairs, food in liquid coolers, beach umbrellas, blankets, beach toys and sporting items and the like. After the desired items are placed upon net 40, bungee cords 46 and 48 are re-attached in the manner shown in FIG. 2 to retain the items placed on net assembly 40. The tote assembly 10 may be pulled along or pushed along by grasping the tubular cross member 16 at the upper end thereof. Wheels 24 and 26 are of a tread-size and diameter which greatly facilitates rolling thereof on sand beaches or other terrain, as well as less rigorous terrain, such as, streets, sidewalks, etc.

The tote assembly is extremely light in weight and contributes very little to the weight of the items being transported. The tote assembly 10 may be stored fully assembled or may be broken down into a more compact package, if desired, requiring only a simple screw driver for disassembly and subsequent reassembly.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. Apparatus for carrying items of a variety of shapes and sizes, comprising:

a frame formed of first and second pairs of tubular members arranged to define a rectangular shaped frame;

a plurality of angle bracket assemblies each at respective corners of said rectangular frame securing an end of one of said pair of tubular members one of said first pair of tubular members;

a first pair of said bracket assemblies being arranged a spaced distance inwardly from first ends of said first pair of tubular members and being movably mounted upon said first pair of tubular members;

wheel assembly having a pair of wheels mounted to said first ends of said first pair of tubular members;

a generally rectangular-shaped net assembly having a perimeter formed of a rope joined to said net assembly;

a plurality of ties loosely joining said rope perimeter to said first and second pairs of tubular members at spaced intervals therealong; and a second pair said bracket assemblies; being respectively movable along said first pair of tubular members, said first and second movable pairs of brackets for respectively increasing or decreasing the spacing between said second pair or tubular members to thereby control the amount of stretching of said net assembly.

2. The apparatus of claim 1 further fastening means from securing the first and second pairs of bracket assemblies at given positions along said first pair of tubular members.

3. The apparatus of claim 2 further comprising openings provided on said bracket assemblies and said first tubular members for receiving said fastening means.

4. The apparatus of claim 3 wherein said first pair of tubular members each have a plurality of openings at spaced intervals therealong to selectively arrange said second pair of tubular members at one of a plurality of given spaced distances apart.

5. The apparatus of claim 1 wherein said bracket assemblies are each comprised of first and second bracket members each having first and second channels arranged at right-angles, said bracket members being joined and cooperating to define openings each for embracing a tubular member therein;

each of said bracket assemblies having a plurality of ear tabs aligned with one another;

fastening assemblies secured to each pair of said ear tabs for joining said bracket members and retaining said tubular members in said channels.

6. The apparatus of claim 5 wherein said openings have a cross-section conforming to the cross-section of said tubular members.

7. The apparatus of claim 5 wherein each of said bracket assemblies is provided with a tab arranged in an inside corner of said bracket assembly, each tab having a cord mounting opening;

a pair of bungee cords each having a pair of hook-shaped ends, each of said hooked-shaped ends being releasably mounted into one of said cord mounting openings.

8. The apparatus of claim 7 wherein said bungee cords are arranged in criss-cross fashion to retain items placed on said net.

9. The apparatus of claim 6 wherein said tubular members are circular and said channels conform to the shape of said tubular member.

10. The apparatus of claim 6 wherein said tubular members have a polygon shape and said channels have a shape conforming to the shape of said tubular members.

11. The apparatus of claim 1 wherein said wheel assembly is comprised of an axle extending through said first pair of tubular members and having wheels mounted thereto, said second pair of bracket assemblies being spaced inwardly from said axle, said first and second pairs of bracket assemblies providing structural strength to said apparatus independently of said axle.

12. The apparatus of claim 1 wherein said first and second pairs of bracket assemblies are movable upon said second pair of tubular members for respectively increasing or decreasing the spacing between said first pair of tubular members to further control the amount of stretching of said net assembly.

\* \* \* \* \*

UNITED STATES PATENT AND TRADEMARK OFFICE
CERTIFICATE OF CORRECTION

PATENT NO.    : 6,092,817                                    Page 1 of 1
DATED         : July 25, 2000
INVENTOR(S)   : Kilmer It is certified that error appears in the above-identified patent and that said Letters Patent is hereby corrected as shown below:

Column 3,
Line 41, change "12c14c" to -- 12c-14c --.

Column 4,
Line 24, after "members" insert -- to --.
Line 30, before "wheel" insert -- a --.
Line 37, after "pair" insert -- of --.

Signed and Sealed this

Eighth Day of January, 2002

Attest:

JAMES E. ROGAN
*Attesting Officer*     *Director of the United States Patent and Trademark Office*